May 28, 1963  N. BRADLEY  3,091,582
NUCLEAR REACTOR SYSTEMS
Filed Oct. 26, 1959  15 Sheets-Sheet 3
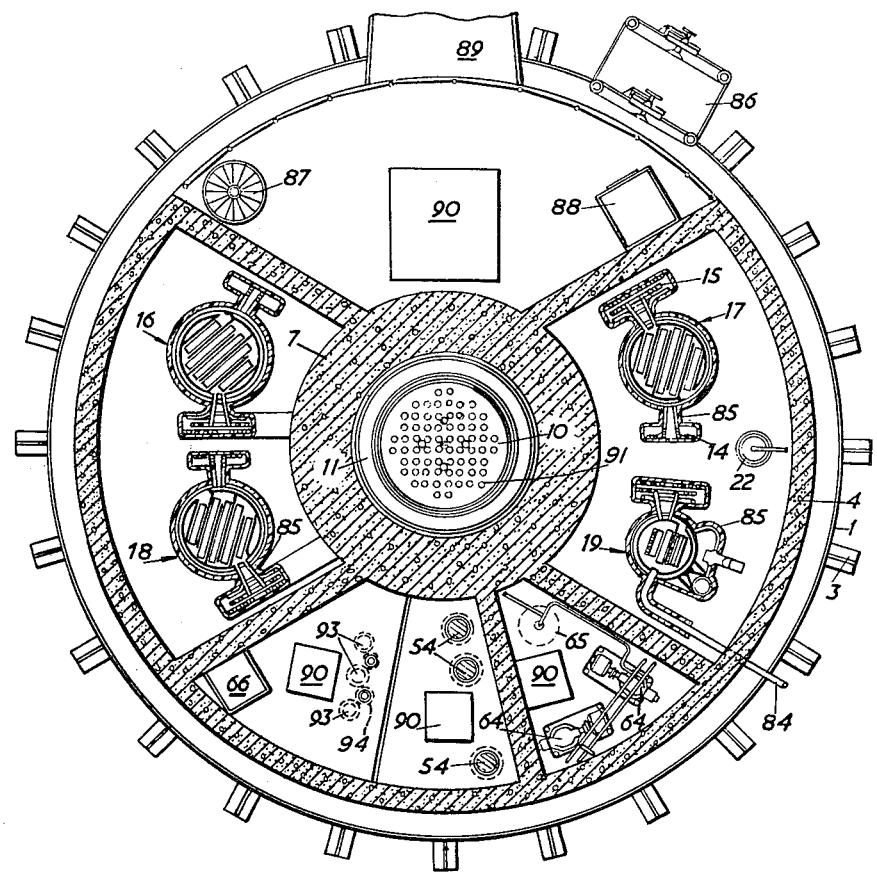
-FIG.3.-
INVENTOR
NORMAN BRADLEY
BY
ATTORNEY

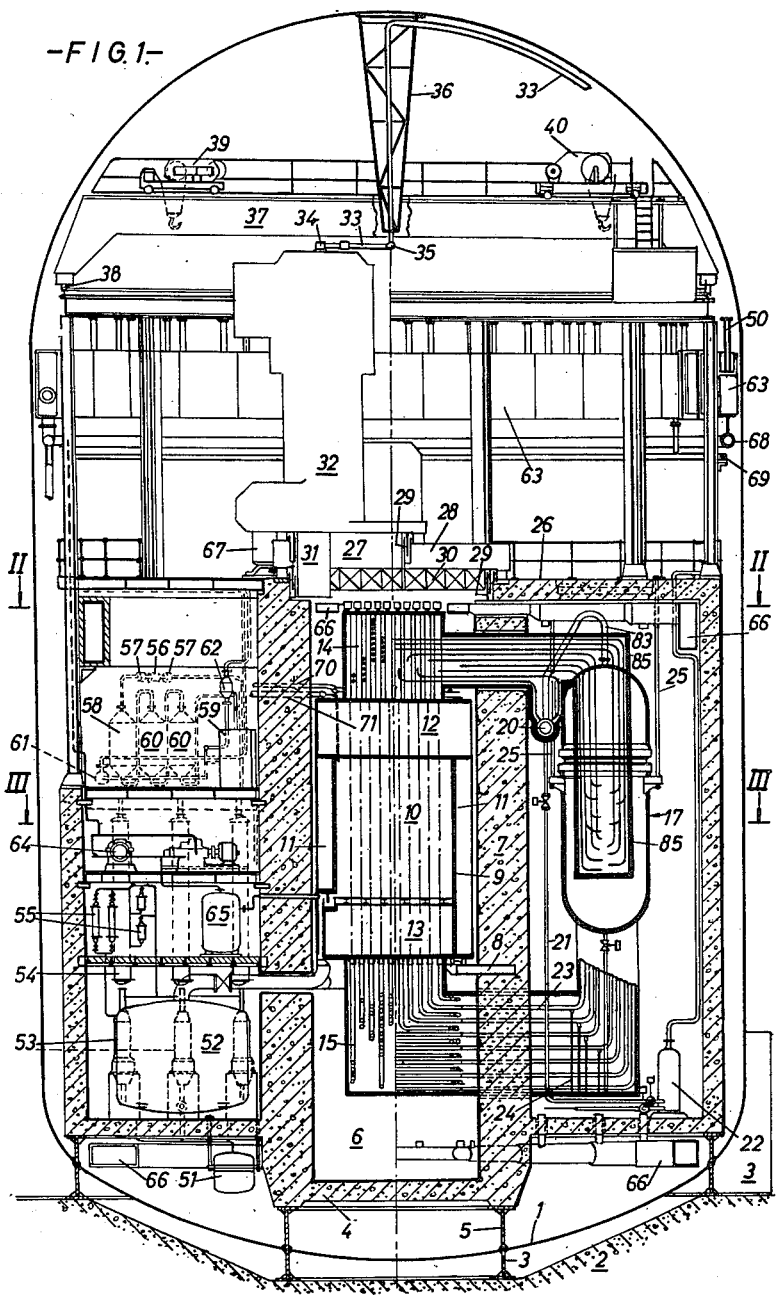

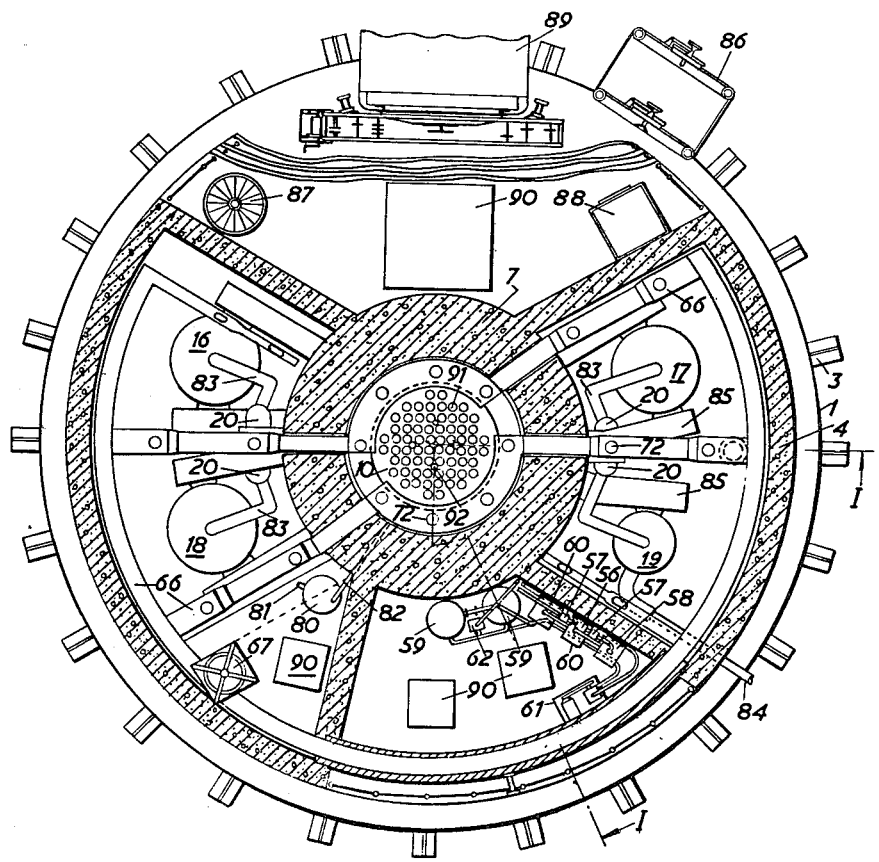
-FIG. 2.-

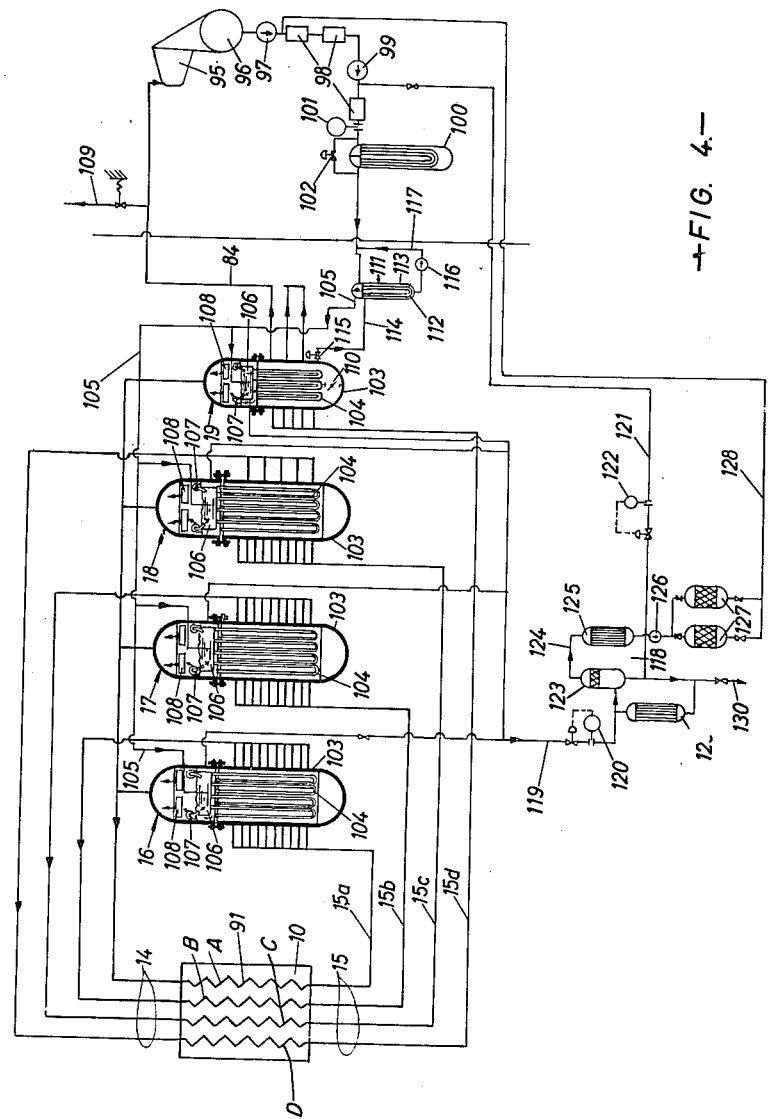

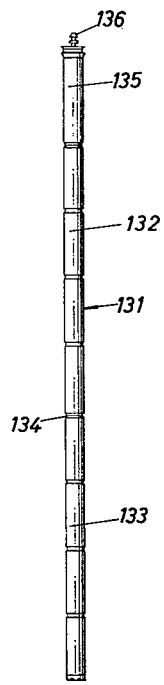
—FIG. 5.—
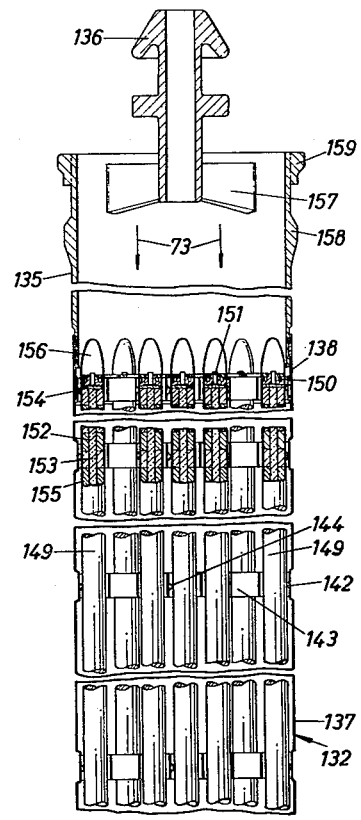
—FIG. 6.—
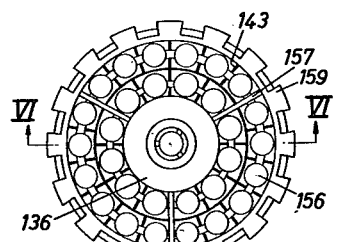
—FIG. 8.—

May 28, 1963  N. BRADLEY  3,091,582
NUCLEAR REACTOR SYSTEMS
Filed Oct. 26, 1959  15 Sheets-Sheet 6
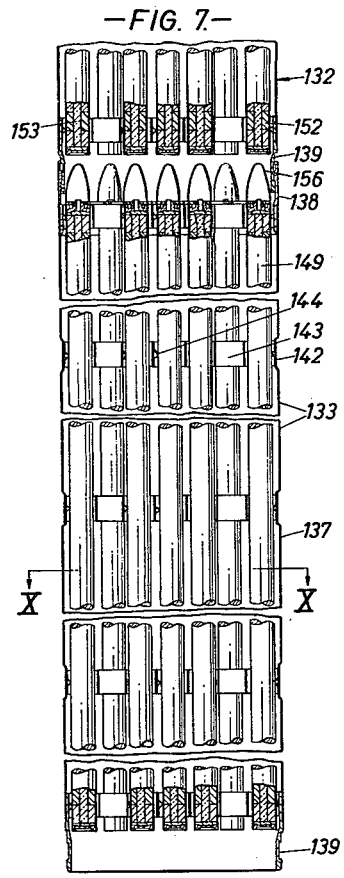
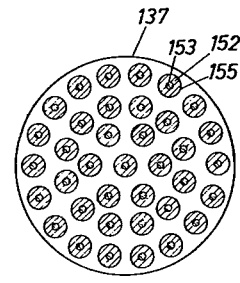
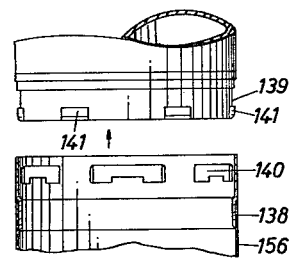
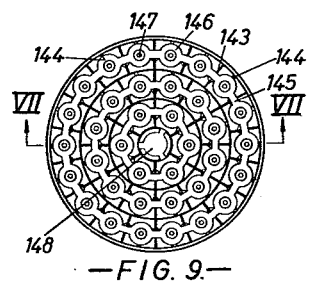
INVENTOR
NORMAN BRADLEY
BY
Larson and Taylor
ATTORNEY

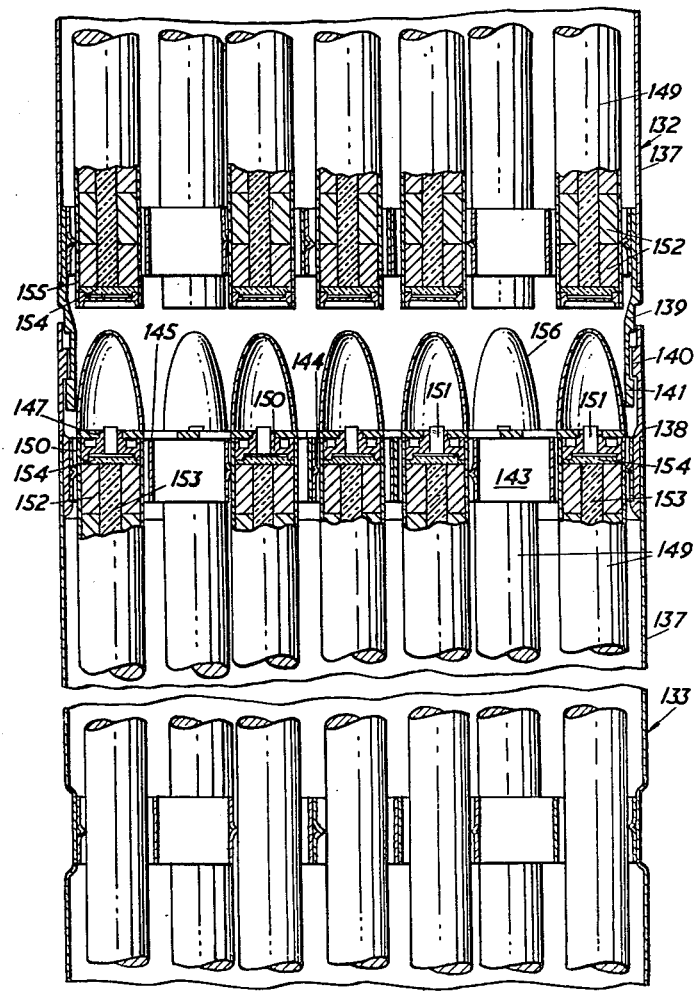
-FIG. 12.-

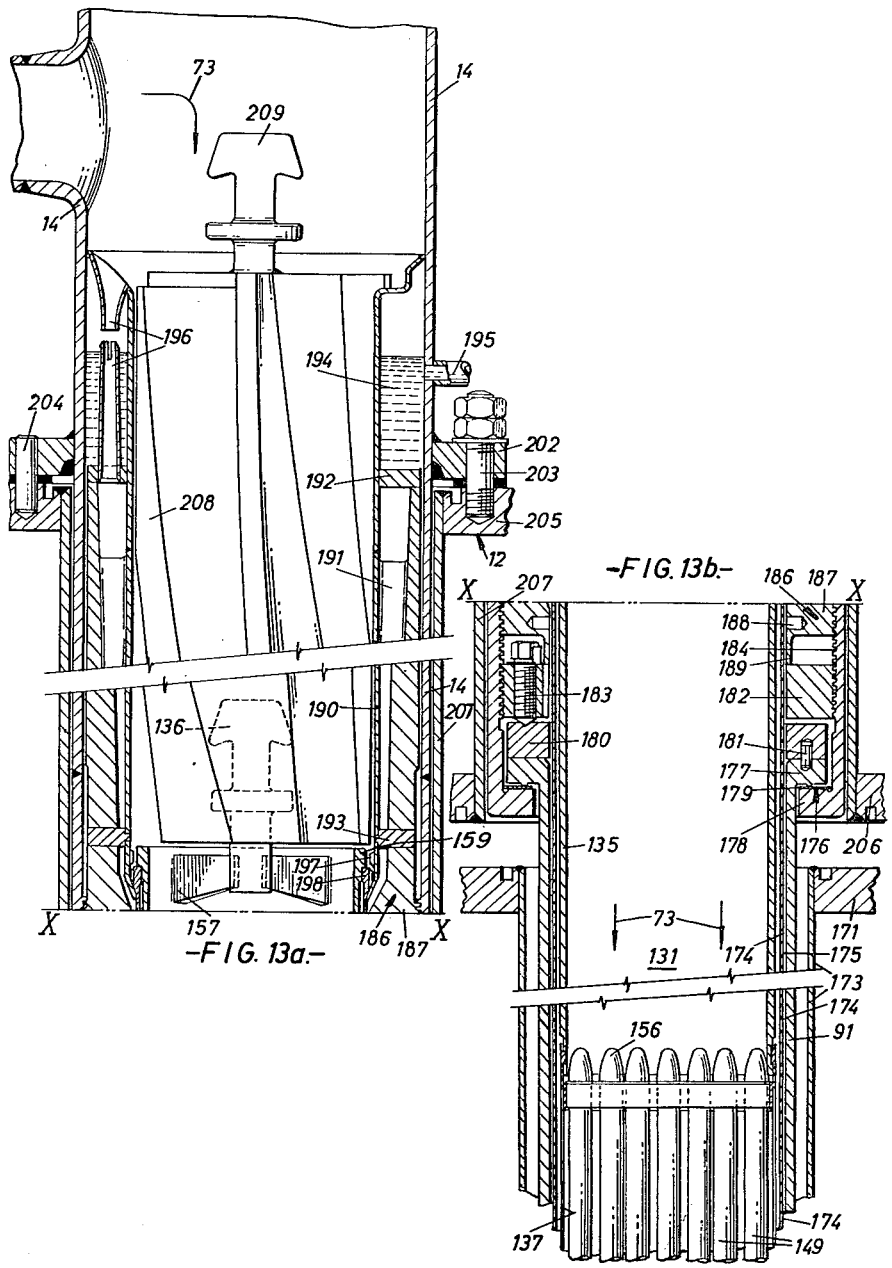

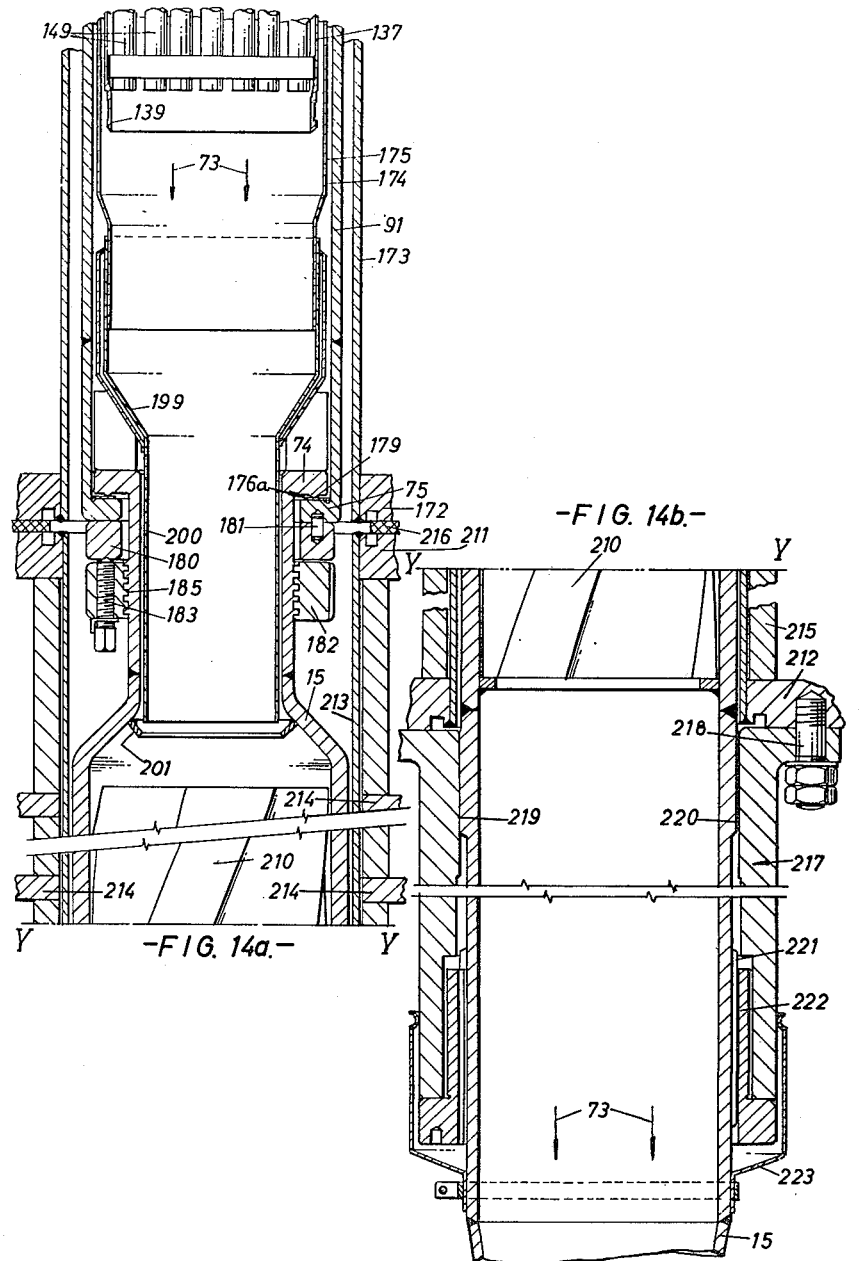

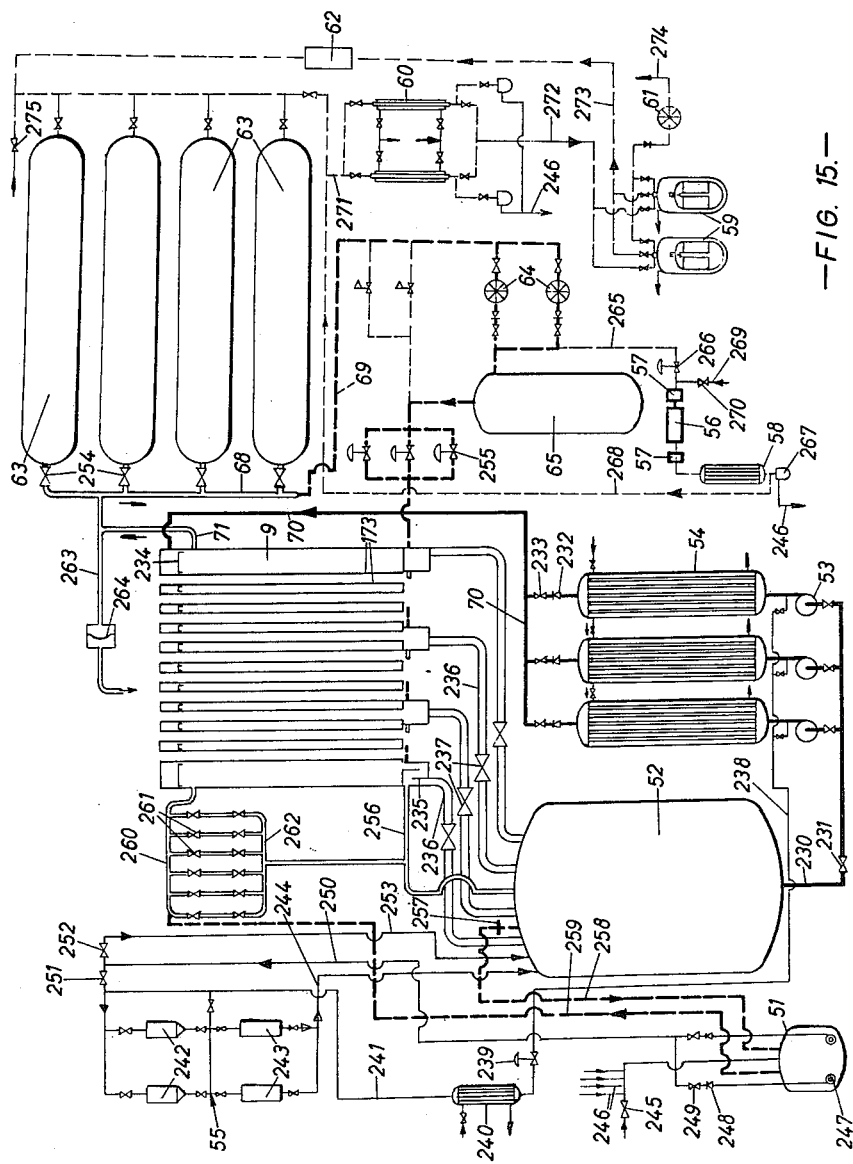

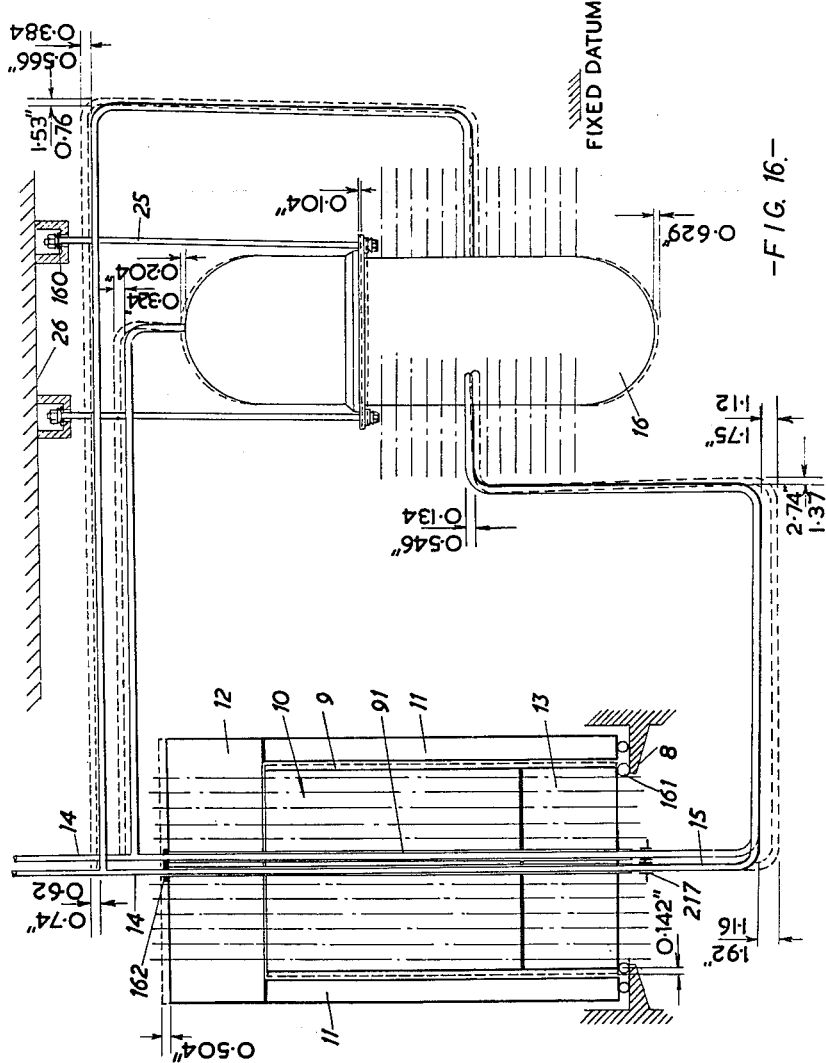

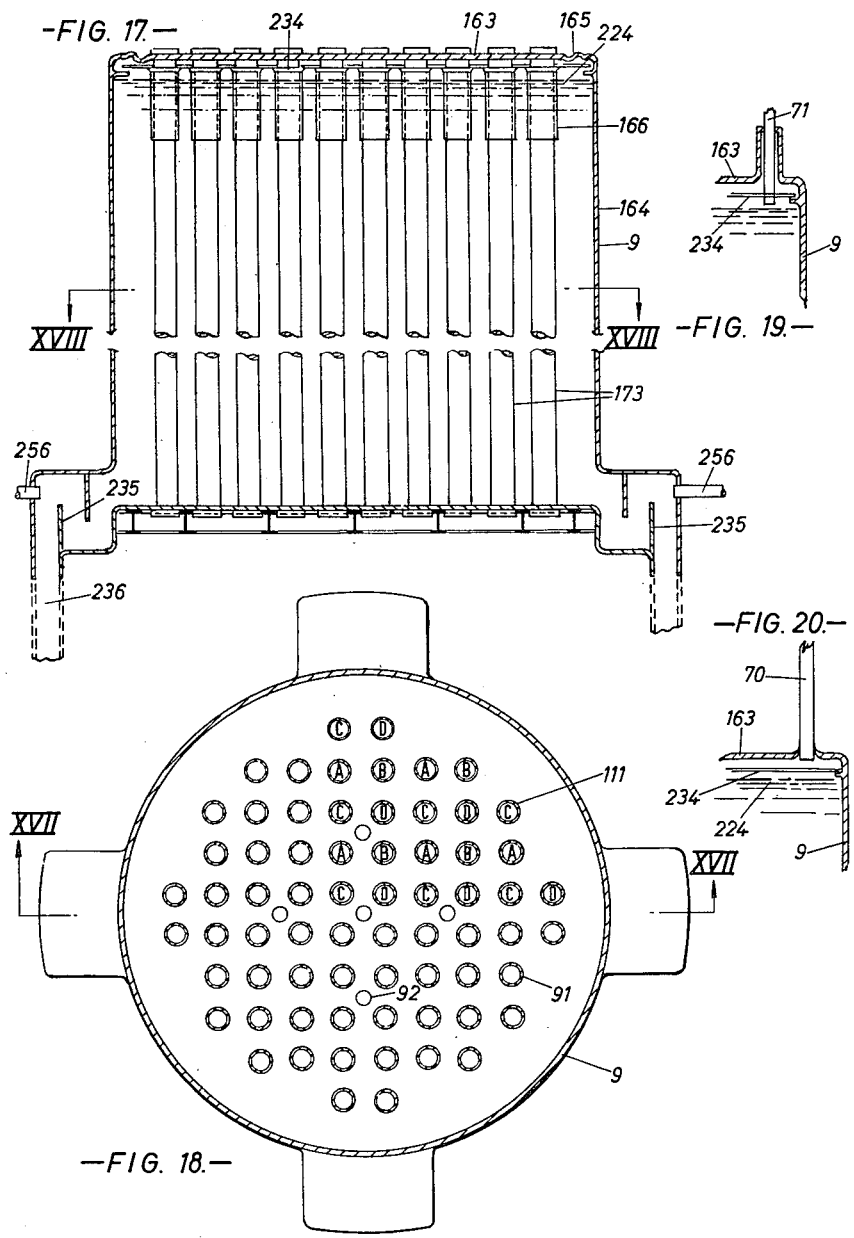

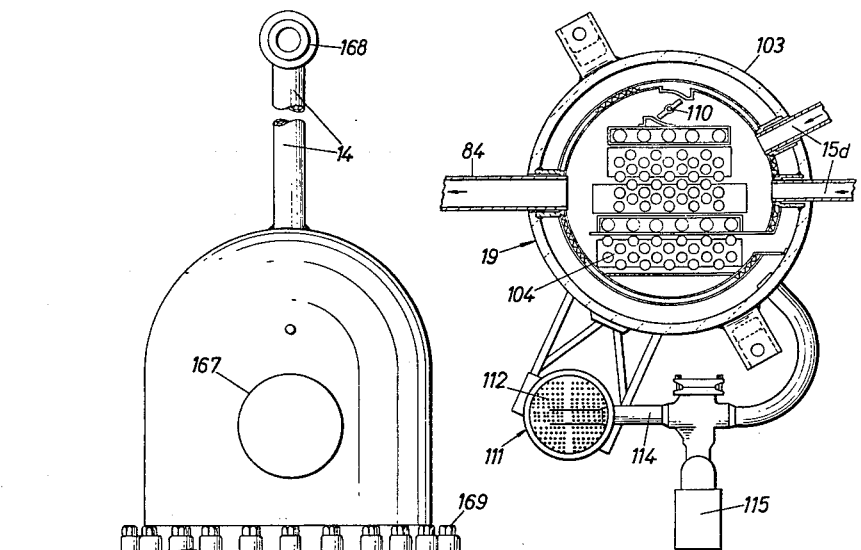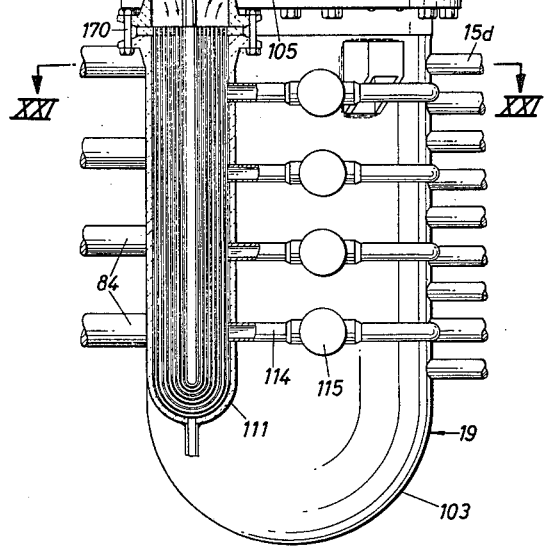
—FIG. 21.—
—FIG. 22.—

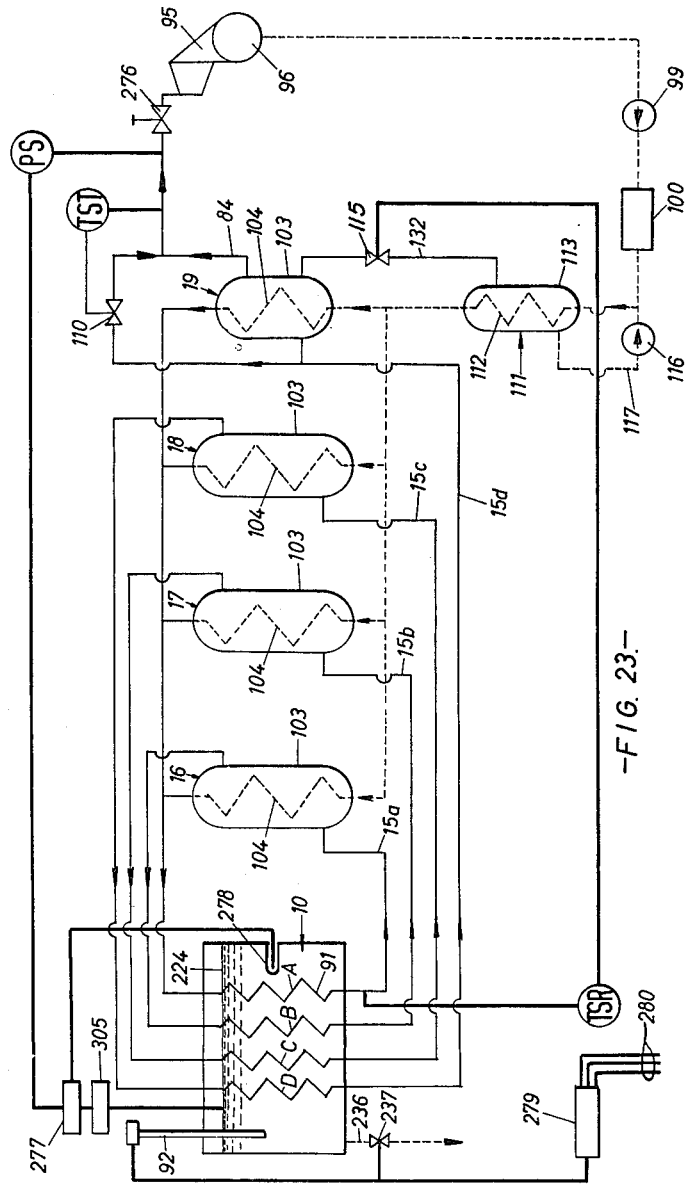

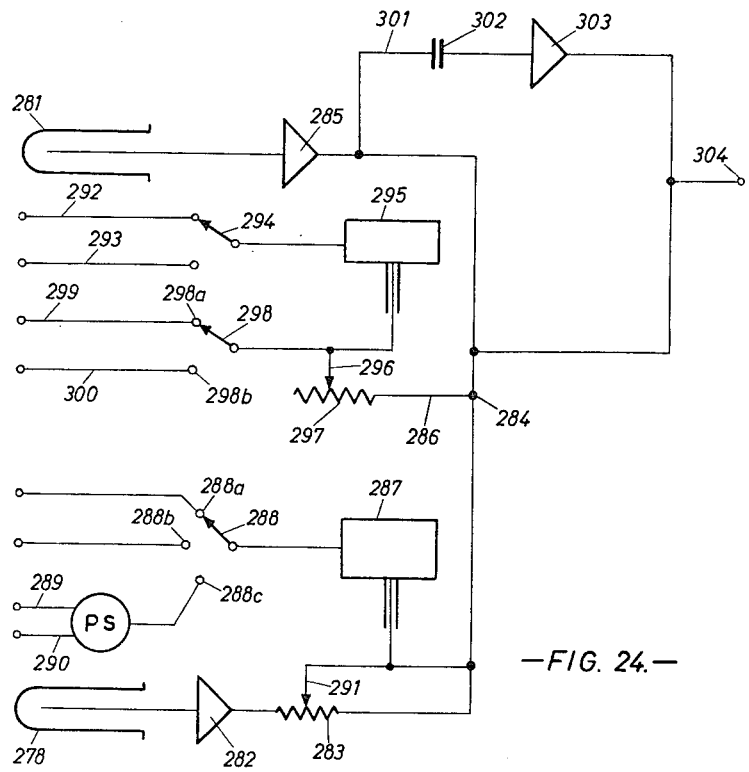
-FIG. 24.-

United States Patent Office 3,091,582
Patented May 28, 1963

3,091,582
NUCLEAR REACTOR SYSTEMS
Norman Bradley, Culcheth, near Warrington, England, assignor to United Kingdom Atomic Energy Authority, London, England
Filed Oct. 26, 1959, Ser. No. 848,720
Claims priority, application Great Britain Oct. 28, 1958
3 Claims. (Cl. 204—193.2)

This invention relates to nuclear reactor systems, that is systems having a nuclear reactor as a heat source, means for generating a superheated working fluid from the nuclear heat and a device, such as a turbine, for converting the heat in the working fluid into mechanical work.

The invention provides a system whereby working fluid is converted from a liquid to a saturated vapour state by heat exchange in evaporators and from a saturated vapour state to a superheated state by nuclear heat, some of the superheated fluid being utilised to produce mechanical energy and some being utilised in the evaporators to produce said saturated vapour the circulation of the fluid being achieved without mechanical pumping in the vapour state and the whole system rendered stable.

An embodiment of the invention will now be described by way of example with reference to the accompanying drawings wherein:

FIG. 1 is a sectional elevation of a reactor (line I—I of FIG. 2).

FIG. 2 is a sectional plan view on the line II—II of FIG. 1.

FIG. 3 is a sectional plan view on the line III—III of FIG. 1.

FIG. 4 is a flow sheet for reactor coolant.

FIG. 5 is a diagrammatic elevation of a fuel element assembly.

FIG. 6 is a sectional elevation of the top of the upper half of the fuel element assembly (line VI—VI of FIG. 8).

FIG. 7 is a sectional elevation of the bottom half of the fuel element assembly (line VII—VII of FIG. 9).

FIG. 8 is a plan view of FIG. 6.

FIG. 9 is a plan view of FIG. 6, with the streamline nose-caps of the fuel elements removed.

FIG. 10 is a section on the line X—X of FIG. 7.

FIG. 11 is a fragmentary view showing the arrangement for the coupling together of the top and bottom halves of the fuel element assembly.

FIG. 12 is an enlarged detail of the upper part of FIG. 7.

FIGS. 13a and 13b are the divided parts of the top part of a fuel channel.

FIGS. 14a and 14b are the divided parts of the bottom part of a fuel channel.

FIG. 15 is a flow sheet for helium and heavy water.

FIG. 16 is a support and expansion diagram.

FIG. 17 is a sectional elevation of the reactor calandria vessel (line XVII—XVII of FIG. 18).

FIG. 18 is a section of the line XVIII—XVIII of FIG. 17.

FIG. 19 is a fragmentary view showing details of helium inlets and outlets.

FIG. 20 is a fragmentary view showing details of heavy water moderator inlet.

FIG. 21 is a sectional plan view of an evaporator (line XXI—XXI of FIG. 22).

FIG. 22 is a side view of an evaporator and shows also a sectional view of the control condenser.

FIG. 23 is a control diagram.

FIG. 24 is a schematic circuit diagram supplementing FIG. 23.

Referring to FIG. 1, a containment vessel 1 is supported on a base 2 by external beams 3. The contents of the vessel 1 are supported in and on a concrete chamber 4 which is carried by internal beams 5. The chamber 4 has an inner compartment 6, the walls of which are of a thickness to constitute a biological shield 7. The shield 7 has support beams 8 for a calandria type core vessel 9. The vessel 9 contains a core 10 which is surrounded by water and aluminium-clad boron steel plate neutron shielding immersed in the water as defined by side compartments 11 an upper compartment 12 and lower compartment 13. Coolant for the core enters by way of pipes 14 and leaves by way of pipes 15. The pipes 14 and 15 connect with a series of evaporators 16, 17, 18, 19 (only 17 being shown) in a manner later to be described with reference to FIG. 4. The evaporators 16–19 are provided with steam drums 20 each having a drain line 21 to a drain tank 22. Pipes 23, connecting between pipes 15 and the evaporators 16–19, have drain lines 24. The evaporators are supported by hangers 25 from the top 26 of the chamber 4. The top 26 is fitted with a rotating shield having an inner rotatable part 27, an outer rotatable part 28, dip seals 29 and a girder support 30. The inner part 27 of the rotating shield is penetrated by the nose 31 of a charge machine 32 which is powered and pressurised by a steam line 33 having two rotatable joints 34, 35. From the joint 35 the line 33 rises vertically along the axis of the vessel 1 and within girder-work 36. A polar crane 37 is provided, rotatable on a rail 38. Hoists 39, 40 are movable on rails on the crane 37. The core 10 is moderated with heavy water which is retained under a blanket of helium with helium pressure control to allow adjusting the level of heavy water to effect control of the reactor and to allow dumping of the heavy water to shut down the reactor. (This system has already been described in relation to the Canadian N.P.D. reactor which is shown in FIGURE 7 of Paper No. P/209 appearing in volume 8 of the Second United Nations International Conference on the Peaceful Uses of Atomic Energy, Geneva, 1958.) The heavy water system is shown as consisting of a heavy water drain tank 51, a heavy water dump tank 52, a series of heavy water pumps 53, heavy water heat exchangers 54, and heavy water purification columns 55. As, under reactor operating conditions, the heavy water in the core vessel 9 decomposes into hydrogen and oxygen a recombination unit 56 is provided. All free heavy water surfaces are swept with helium and a fraction of the helium circulation is continuously fed through the recombination unit 56 which is provided with flame traps 57, the recombined heavy water being returned to the system via pre-coolers 58. A low temperature charcoal absorption unit 59 is provided to remove any nitrogen or oxygen which may exist in the helium so as to prevent nitric acid being produced in the recombination unit. Associated with the charcoal absorbers (which are cooled by liquid nitrogen) are freezer driers 60 (which remove heavy water vapour), a vacuum pump 61 venting oxygen and nitrogen to atmosphere and a reheater 62 for the helium being returned to the system from the absorbers. The helium system includes helium storing tanks 63, helium compressor 64, and a helium receiver 65. The tanks 63 are of part annular construction and are flexible. The tanks are pressurised by the dead-weight offered by a series of pistons 50 and the tanks provide helium to a helium main 68 and to a pipe 69 which leads to the compressor 64. The calandria core vessel 9 is supplied with heavy water by a pipe 70 and the helium main 68 connects to the vessel 9 via a pipe 71.

Ducting 66 supplies coolant to the biological shield 7, the coolant being circulated and cooled by a pump, motor and heat exchanger unit 67. The steam pipes and evaporators of the system are enclosed in lagging 85.

In FIG. 2, some of the components identified on FIG.

1 are shown together with all the evaporators 16, 17, 18, 19. In addition there is shown a water tank 80 for neutron shield cooling having inlet and outlet pipes 81, 82, steam lines 83 from evaporators 16–19 to steam drums 20, and a superheated steam outlet pipe 84 from the evaporator 19.

Various access facilities are also shown including a personnel air lock 86, stairway 87, lift 88, goods air lock 89 and access wells 90.

The pattern of sixty-eight fuel channels 91 in the core 10 is shown together with five control rods 92. The fuel channels 91 are connected to the pipes 14, 15.

Discharge points from biological shield coolant ducting 66 are indicated by circles 72.

In FIG. 3 all previously identified components carry appropriate reference numerals and in addition neutron shield cooling water circulating pumps 93 and heat exchangers 94 are shown.

In FIG. 4 the pipe 84 is shown connected to a turbine 95 associated with a condenser 96, an extraction pump 97, primary feed heaters 98, a feed pump 99, and a high pressure feed heater 100 having a flow controller 101 and a by-pass valve 102.

Each of the evaporators 16–19 is shown as being of shell 103 and tube 104 construction. The shells 103 accept steam superheated in passage through the reactor core vessel 9 and the tubes 104 accept feed water from a feed line 105 via a tank 106 and the steam generated in the tubes 104 passes through steam/water separators 107 to steam driers 108 and then to pipes 14. It is seen that the steam makes four passes through the reaction namely A, B, C and D. First pass (A) superheats the steam generated in the tubes 104 of all four evaporators 16, 17, 18 and 19. The second pass (B) superheats the steam leaving the shell of evaporator 16 only the third pass (C) superheats the steam leaving the shell of evaporator 17 only, and the fourth pass (D) superheats the steam leaving the shell of evaporator 18 only. Steam leaving the shell of evaporator 19 passes to the turbine 95 along the pipe 84. Superheated steam leaves the reactor in four outlets (conveniently called 15a, 15b, etc.) and passes respectively to the shells 103 of evaporators 16, 17, 18 and 19. A dump condenser line 109 is provided so that the turbine 95 can shed a load at a faster rate than the reactor is able to, or alternatively, to allow the reactor to be operated independently of the turbine. The evaporator 19 is provided with a superheat damper control 110 so that superheated steam supplied from outlet 15d can by-pass the evaporator tubes 104 to maintain constant temperature at the turbine stop valve. It is to be noted that economiser sections are not used on the evaporators 16–19. This allows a closer control of the reactor coolant return temperature (i.e. the temperature of steam leaving the shells of the evaporators) by the saturation temperature.

There is provided, in accordance with the invention a heat exchanger 111 (conveniently called a control condenser) which accepts in its tubes 112 all the feed water to the feed line 105. The shell 113 of the control condenser 111 is coupled to the shell 103 of evaporator 19 by a pipe 114 having a control valve 115. The control valve 115 is operated in accordance with the temperature of steam at the reactor outlet (as later described) so that a quantity of steam leaves the shell 103 of evaporator 19 and passes to the shell 113 of the control condenser thus by-passing the turbine 95. In this way temperature stability is achieved throughout the whole system. The steam passing into the shell 113 becomes condensed and is returned to the feed line 105 by a pump 116 and pipe 117.

As there is inevitably a risk that contamination can arise in the steam circuit a purification system 118 is provided. This system has four inlets from the tanks 106 in the evaporators 16–19 connecting into a common pipe 119 having a flow controller 120; and a fifth inlet (pipe 121) from the high pressure side of the feed pump 99. The pipe 121 has a flow controller 122. Pressure drop across the flow controller 120 causes a certain amount of steam to be produced and this is passed into a steam-water separator 123 whence the steam passes by a line 124 to a condenser 125 and thence via a circulating pump 126 to an exchange column 127 having an outlet pipe 128 connecting back to the low pressure side of the feed pump 99. The water in the separator 123 together with that in the line 121 is boiled in a reboiler 129. At suitable intervals active waste retained in the water is drawn off through a valve 130.

In FIG. 5 a fuel element assembly 131 is shown, the assembly consisting of two units 132, 133 jointed at 134 (by the arrangement shown in FIG. 11), and having an extension sleeve 135 and lifting head 136.

FIGS. 6 to 12 show the units 132, 133 in more detail. Each unit has a stainless steel sleeve 137 terminating in an upper end band 138 and a lower end band 139. The band 138, as shown in FIG. 11 has a series of shaped metal plates 140 and the band 139 a series of shaped metal plates 141 so that when the bands are brought together the plates 141 first move between plates 140 and then by rotation of unit 132 relative to 133 the plates 141 can be brought to the centre underside of plates 140 where they locate. In this way the units 132, 133 can readily be separated so that their positions can be interchanged to equalise irradiation. (Sometimes referred to as "axial inversion.") Similarly the extension sleeve 135 carries plates identical to plates 141 so as to locate with the plates 140 of unit 132.

Each unit 132, 133 has its sleeve 139 formed with a series of circumferential indentations 142, to which are welded, on their inner surfaces, thin webbed grids 143 having small lateral projections 144. On the upper of the grids 143 (of the units 132, 133) there rests three concentric rings 145 having circular parts 146 with perforations 147 (FIG. 9). In the centre of the upper grid 143 there is a small spider 148. Each perforation 147 carries a fuel element 149, the fuel elements 149 each having an end cap 150 and a peg 151 (in their upper end caps only) which extends through the perforation 147 and is welded to the respective ring 145 so that the fuel elements (except the centre one) are carried by the rings 145. The upper end cap 150 of the center fuel element 149 is attached to the spider 148. The "legs" of the spider 148 extend across the adjacent parts of the upper grid 143 so that the center fuel element 149 is supported by said grid 143 also. There are thirty-seven fuel elements 149 in each of the units 151, 152. Each fuel element 149 is made from a stack of short uranium dioxide tubes 152, the centre of the tubes 152 being filled with magnesia 153. The stack of tubes 152 is terminated by magnesia heat insulating discs 154 and tubes and discs are enclosed in a stainless steel sheath 155. Each fuel element 149 has at its upper end a streamline cap 156 (coolant flow downwards along the fuel assembly as indicated by the arrows 73).

The extension sleeve 135 is attached to the lifting head 136 by three webs 157 and the sleeve has guide splines 158 and locating splines 159 so that as it is lowered into its fuel channel (see below) it locates itself by the guide splines 158 directing the locating splines into appropriate recesses at the top of the channel.

Referring to FIGS. 13a–b and 14a–b the calandria core vessel 9 is represented by top cover 171, base 172 and calandria tubes 173. The calandria tubes 173 contain the fuel channels 91 which have thin zirconium barrier sleeves 174 lining and spaced from the channels 91, which are also of zirconium, by narrow gaps 175. The channels 91 each terminate at their upper ends in a joint 176 which consists of an external flange 177 on the channel 91, an internal flange 178 on a tube 14 (which is of steel) and a gasket 179. The channels 91 each terminate at their lower ends with a similar joint 176a to a pipe 15 (which is also of steel) the joint comprising an external flange 74 on the pipe 15, an internal flange 75 on the lower end of the channel 91 and a gasket 179. It is to be noted that the joints 176, 176a are swept with steam at only saturation temperature. A degree of axial temperature compensation is effected at the joints by compensating rings 180 which have dowels 181 to locate them with the flanges 177, 75. The joints 176, 176a are clamped by locking rings 182 carrying clamping bolts 183. The rings 182 are retained in the pipe 14 (for the upper joint 176 by a square-thread 184 and in the pipe 15 (for the lower joint 176a) by a thread 185. Inside the pipe 14 there is a by-pass unit 186 for by-passing a part of the stream in the pipe 14 to flow along the gap 175. The unit 186 comprises a screwed part 187 screwed into an upper extension of the thread 184 and provided with holes 188 for location by a screwing-up tool and a skirt 189 which bears upon the ring 182 below. An inner sleeve 190 is attached to the part 187 by stiffening ribs 191 and stiffening pegs 193. Between the sleeve 190 and the part 187 there is a ring 192 which forms the base of a water reservoir 194 fed by a pipe 195 which carries condensate from the water side of a steam drum 20. The temperature of the channel 91 is limted to 320° C. to avoid embrittlement although occasional temperature excursions up to 400° C. would be acceptable. The temperature of the calandria tube 173 is limited to 100° C.

The reservoir 194 contains a series of spray generating nozzles 196 which utilize the by-pass steam flow to feed a water spray into the gaps 175 so as to cool the zirconium channels 91. The barrier sleeve 174 rests on the bottom end of the sleeve 190 and splines 197, 198 are provided on the sleeves 174 and 190 respectively which prevent withdrawal of the sleeves 174 without first aligning the splines. The lower end of the sleeve 174 fits into a double-walled sleeve 199 which has a single wall extension 200 extending into the pipe 15. A condensate deflector plate 201 is attached to the pipe 15 at a point just below the lower end of the sleeve extension 200. The tube 14 has a flange 202 attached by studs 203 and located by dowels 204 to the upper neutron shield tank 12. The shield 12 is defined by top plate 205, bottom plate 206 and spacer tube 207. A neutron scatter plug 208 of helical form is provided in the sleeve 190 and has a lifting head 209. A fuel element assembly 131 as described above in relation to FIGS. 6–12 is also shown. A neutron scatter plug 210 of helical form is shown in the tube 15. The bottom shield tank 13 is defined by top plate 211 and bottom plate 212 with spacer tubes 213 and enclosing horizontally-disposed aluminium clad boron steel plates 214. Steel tubes 215 spacing the plates 214 act as a gamma shield. Plates 211, 172 are separated by a packing 216. The plate 212 carries a steel guide block 217 of tubular form by studs 218 and the tube 15 is a close fit within this block over a face 219 having passageways 220. The pipe 15 also has splines 221 which fit in a splined bush 222 carried by the block 217. A muff 223 is provided to seal the pipe 15 to the block 217.

FIG. 15 shows a combined helium and heavy water flow diagram.

Considering first the heavy water, one starts at the dump tank 52 which has an exit pipe 230 with a control valve 231. The heavy water is circulated by the three pumps 53 drawing from the pipe 230 and feeding the three heat exchangers 54. From the heat exchangers 54 the heavy water passes through non-return valves 232 and control valves 233 via the pipe 70 to the top of the calandria core vessel 9. In the core vessel 9 there are a number of distributor plates 234 which distribute the in-flowing heavy water over the upper ends of the calandria tubes 173 so that the tubes remain cool even when the level of heavy water in the vessel 9 itself falls below these ends. From the base of the vessel 9 the heavy water spills over a number of weirs 235 and into pipes 236 having isolation valves 237 to return to the tank 52. In addition to this main circulation of the heavy water a subsidiary circulation takes place through bleed line 238. The heavy water flowing along the line 238 passes through a control valve 239 to a precooler 240 and then via a pipe 241 to filters 242 and ion-exchange columns 243 constituting the purification unit 55 shown in FIG. 1. The heavy water now purified then returns to the dump tank 52 via a pipe 244. Heavy water can be fed to the system via an inlet valve 245 whence it passes to the drain tank 51 together with heavy water obtained from a number of drain points 246. The tank 51 has pumps 247, non-return valves 248 and control valves 249 connecting with a pipe 250 which divides at control valves 251, 252 to allow heavy water to be passed either through the purification unit 55 or direct to the dump tank 52 via a pipe 253.

The helium can be considered as having a primary and secondary distribution. The primary distribution begins at the storage tanks 63, whence it passes through control valves 254 to the main 68 and pipe 69 to the compressors 64 and receiver 65. From the receiver the helium passes through control valves 255 to the weirs 235 the upper parts of which are connected to the upper interior of the heavy water dump tank 52 by a pipe 256. From the tank 52 the helium passes through an orifice plate 257 and pipe 258 to the heavy water drain tank 51. From the tank 51 the helium flows along a pipe 259 to the top manifold 260 of a series of dump valves 261. From the manifold 260 the helium flows to the underside of the distributor plates 235, whence it is collected in the pipe 71 to return to the main 68. The dump valves 261 have a bottom manifold 262 connecting with the pipe 256. A pipe 263 branching off from the pipe 71 is provided with bursting disc 264 to provide safety in the event of high pressure steam leakage into the heavy water or helium system. The secondary helium distribution is designed to achieve two ends: first the recombination of deuterium and oxygen formed by radiolytic decomposition of the heavy water and carried round by the helium and secondly the removal of excess nitrogen and oxygen from the helium system. To achieve recombination a fraction of the helium is continuously bled from the receiver 65 along a line 265, through a control valve 266 to the recombination unit 56, 57. Recombined heavy water then passes through the pre-cooler 58 to a drain 267 and drain line 246. The helium is returned to the system by a pipe 268. Oxygen is fed into the inlet of the recombination unit 56, 57 by a pipe 269 and control valve 270 so that all the deuterium is fully recombined. To achieve removal of nitrogen and oxygen (particularly required on first filling the plant with helium) a bleed from the pipe 268 is taken along a pipe 271 and thence to the freezer driers 60 to remove any heavy water in the vapour phase. From the freezer-driers 60, heavy water is returned to the system via drain line 246 and the helium together with any nitrogen and oxygen passes along a pipe 272 to the liquid nitrogen cooled charcoal absorbers 59. The purified helium returns to the storage tanks 63 via a pipe 273 and reheater 62 and the nitrogen and oxygen are discharged to atmosphere via the vacuum pump 61 and pipe 274. Helium is introduced into the system at an inlet control valve 275.

The pressure of helium acting at the weirs 235 maintains the level of heavy water in the calandria 9. The pressure is regulated by flow through the valves 255 in conjunction with the orifice plate 257. Should a rapid reduction in reactivity be required in the reactor the dump valves 261 are opened to equalise pressure across core so that the heavy water flows from the core vessel 9 into the pipes 236 from thence into the dump tank 52. If the incident that demands reduced reactivity is a steam coolant leak into the heavy water moderator held in the vessel 9, then the valves 237 can be closed once the moderator has passed into the dump tank 52, so as to prevent steam passing into the dump tank where it would condense and dilute the heavy water with light water.

In FIG. 16 the majority of the components have been identified from earlier figures of the drawings. The hangars 25 are shown on swivel mountings 160 attached to the top 26 of the shield 7. The bottom neutron shield tank 13 and side neutron shield tanks 11 are shown carried on balls 161. The pipes 14 are shown fixed to the top shield tank 12 at 162. (This corresponds to studs 200 of FIG. 13.) The dotted lines indicate calculated expansions. The magnitude of these expansions are shown by dimensions. Double dimensions are shown where pipes of varying lengths exist, the dimensions referring to the largest and shortest pipes respectively.

In FIG. 17 the core vessel 9 is shown as having a top 163 sealed to the walls 164 via a bellows 165. The level (which is variable to effect control) of the heavy water in the vessel 9 is indicated by the reference numeral 224. The distributor plate 234 is shown and the plate is shown distributing heavy water into the inside of tubes 166 which surround, but are spaced from the calandria tubes 173. The method of introducing heavy water moderator into the vessel 9 is shown in FIG. 20. The feed pipe 70 is shown terminating in the top 163 of the vessel 9 above the distributor plate 234 so that heavy water falls on to the plate 234 whence it is distributed in the annuli between tubes 166 and 173 so that the tubes 173 are cooled even when the level of heavy water falls in the course of control of the reactor.

FIG. 18 is provided to show how the sixty-eight channels 91 are arranged to provide four distributed passes through the reactor. The channels have been identified by the letters A, B, C, D, on a recurring pattern. Channels marked A form the first pass which takes all the saturated steam generated in the tubes 104 of evaporators 16, 17, 18, 19 (FIG. 4) and superheats it and passes it through pipe 15a to the shell of evaporator 16. Channels marked B form the second pass which takes the steam from the shell of evaporator 16 and passes it through pipe 15b to the shell of evaporator 17, and so on providing four passes in all. This arrangement ensures that flux distributions affect each pass equally.

In FIG. 19, the helium inlet pipe 71 is shown terminating below the distributor plate 234 as it is here that the radiolytic deuterium and oxygen congregates to be swept away by the circulating helium.

In FIG. 21 the components of the evaporators 16-19 have been identified and FIGURE 21 is presented in order to show mechanical layout of one of the evaporators, in this instance evaporator 19.

FIG. 22 (which again is intended to show mechanical layout) has four components not previously identified. These are access manhole 167, flange coupling 168 for pipe 14, bolts 169 holding the halves of evaporator 19 together and bolts 170 holding the parts of the control condenser 111 together.

In FIG. 23 the temperature (850° F.) and pressure (600 p.s.i.g.) conditions at the turbine stop valve 276 are, in accordance with conventional practice, kept constant with load. The temperature control at the turbine 95 is provided by a temperature signal TST controlling the damper 110 which allows steam flowing from pass D to by-pass the tubes 104 of the evaporator 19. Thus as the temperature at the stop valve 276 falls the damper 110 opens to allow more superheated steam to reach the turbine 95 without giving heat to feed water in the tubes 104 of the evaporator 19. Steam pressure at the turbine 95 is kept constant by varying reactor power. A pressure signal transmitter PS is provided which initiates reactivity reduction as steam pressure increases. Reactivity is altered, as mentioned above by control of level of the heavy water moderator, thus, if steam pressure at the turbine 95 increases the level of heavy water in the core vessel 9 is caused to fall which decreases reactivity until the reactor power drops to a new stable level when the heavy water is caused to rise again to stabilise the reactivity at the new stable power level. This is achieved by the control offered by the reactivity control circuit 277 in combination with signals received from an ion chamber 278.

Steam temperature control at the reactor outlet from the reactor (Pass A, channel 91) is provided by a temperature signal TSR controlling the valve 115 of the control condenser 111. If steam temperature rises at the reactor outlet the valve 115 is opened thus allowing steam to flow from the shell 103 of the evaporator 19 to facilitate the generation of steam in all the evaporators 16-19 by adding heat to feed water flowing through the tubes 112 of the control condenser 111. The mass flow of steam coolant through tubes 91 of the reactor is thus increased to depress the coolant outlet temperature to provide a stabilizing effect.

A conventional emergency shut down circuit 279 is provided coupled with trip circuits 280 and designed to both operate moderator dump valves 237 and control rods 92.

In FIG. 24 details of the reactivity control circuit 277 are shown.

The reactor is provided with two ion chambers 278 and 281, chamber 278 being connected via a linear amplifier 282 and control potentiometer 283 to a sum point 284 and chamber 281 being connected via a lorgarithmic amplifier 285 to the sum point 284. Also connected to the sum point 284, there is a line 286 which carries a bias (or reference) current in antiphase to current derived from either of the chambers 278, 281. The potentiometer 283 is part of a servo loop and is activated by a motor 287 connected to be driven under control of an error signal derived either from the pressure signal transmitter PS or by operator control depending upon the position of a switch 288. With the switch on contact 288a, a signal is transmitted to increase reactor power, on contact 288b, a signal is transmitted to decrease reactor power and, on contact 288c, reactor power is controlled by the steam pressure at turbine stop valve 276 (FIG. 23) as indicated by transmitter PS. Input line 289 to PS is the "demand" level and line 290, is the "actual" level of steam pressure. The control rate (which is proportional to error) is set such that a 12 p.s.i. steam pressure error produces maximum speed of motor 287. The motor is arranged to move the slide 291 of the potentiometer 283 so that the reactor traverses from 10 to 100% full power in 15 minutes (i.e. 6% per minute). For operation between 10% and 100% full power the "linear" channel (278/282) is used and the "log" channel (281/285) exerts no effective control. For operation up to 10% full power the "log" channel is used and the "linear" channel exerts no effective control. In the case of "log" channel operation variation of the bias (or reference) signal is used whilst the output from the amplifier is not changed.

A "rate" start up of the reactor can be used. For this purpose, a rate switch 298 having contacts 298a and 298b is provided with the switch on contact 298a a stabilised negative bias signal is provided from a line 299. This bias signal greatly exceeds the signal in the "log" channel and causes reactivity to be increased at the maximum rate of 0.2% per minute. The rate of rise gradually increases over a period of 15 minutes until it reaches 1% per second at which point the reactor is within 0.3% of critical and the power is approximately 3 kw. The rate of rise signal (as derived via line 301, differentiating condenser 302 and amplifier 303) now balances the bias signal at an output sum point 304 and hence the reactivity stops increasing but the power rises at the steady rate of 1% per second until the reactor is approximately 0.1% over critical. The reactivity then stays constant as the power continues to rise at 1% per second up to 100 kw.

With the switch on contact 298b, zero volts is derived from a line 300. This causes the reactivity to change such that the flux decreases at a steady logarithmic rate of 1% per second.

At a level of 100 kw. the "log" channel has generated a negative reactivity signal which reduces reactivity to "just critical," the bias signal being exactly balanced at sum point 284 by the "log" signal. The reactor remains critical and operates at steady power. At this point a servo motor 295 can be energised to provide manual control based on the output from the "log" channel in chamber 281. The motor 295 is controlled by "up" line 292 and "down" line 293 and switch 294.

When the motor 295 is started the reactor is brought above critical and the power increases at a rate such that the current in the "log" channel can steadily follow the bias current which is changed by the motor 295 moving a potentiometer slide 296 over a wire 297. With constant motor speed there is an exponential power rise of constant period. The power can increase in this manner up to 10% full power which is the limit of the potentiometer 296/297. The "linear" channel control can then take over. The current at output sum point 304 effects reactor control via a heavy water level controller 305 (FIG. 23).

The amplifier 285 covers six decades. The motor 295 traverses from 0.1% to 10% full power in ten minutes.

The sequence of start-up of the reactor may be described as follows:

(1) The reactor is sub-critical, and all components are at room temperature.
(2) All stop valves and safety valves are closed, and the water side of each of the evaporators 16–19 is filled.
(3) Steam at 30 p.s.i.a. from an external boiler is introduced into the first pass (A) at a rate of 3000 lbs. per hour.
(4) Condensate is continuously drained from low points of the system and fed back to the boiler.
(5) Heating takes place gradually along the steam circuit with A reactor pass coming up to the saturation temperature first, followed by evaporator 16, B reactor pass and so on all components are at the same temperature of 250° F. and the feed water is exactly at the boiling point.
(6) As steam pressure approaches 30 p.s.i.a. the input flow from the external boiler is reduced, until finally the steam flow in, just compensates for the heat losses to the moderator and the atmosphere.
(7) Circulation is now established by opening valve 109 to the dump condenser slightly, and increasing the steam input by the external boiler. Sufficient flow should be established to ensure that there are no water blockages, and that pressure conditions remain stable.
(8) With circulation established, the addition of a small amount of heat from the reactor causes a slight superheating of the steam flowing to the evaporators 16–19. Since the feed water is already at the boiling point, evaporation will commence and an increase in steam flow will be observed.
(9) Suppose for example that the external supply of steam is maintaining a steady flow of 1000 lbs. per hour at 250° F. and 30 p.s.i.a. This steam supply is equivalent to an energy input of approximately 300 kw. Hence a reactor power of 30 kw. would cause an observable increase in flow.
(10) The reactor power is brought up to 30 kw. and the external steam supply reduced to maintain constant pressure and flow at the dump condenser. As reactor power is increased, the 30 p.s.i.a. steam flow from the external boiler can be continuously reduced, until the steam generating circuit is operating entirely on nuclear heat at a level of 300 kw.
(11) From this stage onwards, temperature increases arise entirely from nuclear heating of the circulating steam. Approximately 10 mw.-hours of additional heat energy are required to bring all components up to their equilibrium operating temperatures corresponding to a steam condition of 600 p.s.i.g. and 850° F. at the stop valve.
(12) The increase in steam temperature and pressure is actually accomplished by throttling the steam flow leaving the evaporator 19, and at a rate such that reactor outlet temperatures do not become excessive. The by-pass 115 to the control condenser 111 should be open, and the temperature control damper 110 should be closed, in order to minimise the loss of heat to the dump condenser.
(13) When the temperature at the reactor outlet is 850° F., and the pressure 600 p.s.i. the flow of steam can be directed to the turbine 95 and the reactor put on automatic pressure control. The power required to accelarate the turbine 95 to synchronous speed is very small. However the no load consumption at full speed is about 10% of maximum flow.

Hence if the power is kept at 10 mw., a gradually increasing flow can be directed from the dump condenser to the turbine 95 until synchronous speed is attained.
(14) The power is then controlled entirely from the turbine house, depending on the steam demand as determined by the position of the stop valve 276.
(15) Corresponding to each demanded flow of steam at the correct turbine condition three controlled parameters must move to their correct positions. The reactor power, the control condenser by-pass flow, and the temperature by-pass flow must all obey their control equations and the automatic control system ensures that they do.

Main parameters, performance and design data are now given.

A1.1 General:
  Reactor output _____ 95 mw. (Th.).
  Net electrical output _____ 29 mw. (E.).
A1.2 Reactor core:
  Core length _____ 11 ft.
  Core vessel internal diameter___ 10.35 ft.
  Radial reflector thickness ($D_2O$) _____ 12″.
  Axial reflector thickness ($D_2O$) _____ 12″.
  Lattice pitch _____ 11″ square.
  Total number of channels _____ 68.
  Length of uranium dioxide in channel _____ 10.93 ft.
A1.3 Fuel and physics data:
  Weight of uranium oxide ($UO_2$) per channel (based on 10.4 gm./cc.) _____ 128.8 kg.
  Total weight of fuel ($UO_2$) in core _____ 8.76 T. $UO_2$.
  Contained uranium in core ____ 7.7 Tu.
  Peak reactor rating _____ 30 mw./Tu.
  Mean reactor rating _____ 12.32 mw./Tu.
  Mean centre channel rating ___ 17.85 mw./Tu.
  Centre channel output _____ 2.35 mw.
  Axial averaging factor _____ 1.45.
  Radial averaging factor _____ 1.68.
  Average burn up _____ 6000 mwd./Tu.
  Fuel element data:
  Fuel_____ $UO_2$
  $UO_2$ diameter (cold) _____ 0.474″ x 0.16″ I.D.
  Fuel element length _____ 65.6″.
  Can dimensions (cold) _____ 0.48″ I.D. x 0.015″ thick.
  Canning material _____ 25% Cr, 20% Ni st. steel.
  Volume of stainless steel in end rings, support grids and spacing grids _____ 13.73 ins.³.
  Volume of stainless steel in outer sleeve _____ 18.7 ins.³.
  Volume of stainless steel in cans, end caps support spiders _____ 115 ins.³.
  Total volume of stainless steel in channel _____ 147.5 ins.³.
  Volume of $UO_2$ in channel _____ 755.7 ins.³.
  Volume of $D_2O$ associated with one fuel channel _____ 11,933 ins.³.
  Volume of $D_2O$/volume of $UO_2$ for a fuel channel cell _____ 15.75.
  Volume of $D_2O$/volume U for a fuel channel cell _____ 32.1.
  Fuel maximum rating _____ 30 mw./Tu.
  Can nominal maximum temperature _____ 650° C.
  $UO_2$ maximum temperature—
    (a) At beginning of life_____ 1300° C.
    (b) After irradiation to 6000 mwd./Tu _____ 2100° C.

A1.3 Fuel and physics data—Continued

| | |
|---|---|
| Initial enrichment | 2.2 Co about. |
| A1.4 Channel tube design: | |
| Outer diameter of stainless steel fuel element sleeve | 4.52 in. |
| Thickness of fuel element sleeve | 0.01 in. |
| Outer diameter of zirconium-alloy liner | 4.823 in. |
| Thickness of zirconium-alloy liner | 0.055 in. |
| Inner diameter of zirconium-alloy pressure tube | 4.983 in. |
| Thickness of zirconium-alloy pressure tube | 0.25 in. |
| Inner diameter of aluminium calandria tube | 5.983 in. |
| Thickness of calandria tube | 0.128 in. |
| A1.5 Coolant circuit: | |
| Reactor design pressure | 825 p.s.i.g. |
| External coolant circuit design pressure | 1100 p.s.i.g. |
| Mean pressure in the reactor | 715 p.s.i.g. |
| Temperature at inlet to the reactor— | |
| (a) Pass A | 516° F. (269° C.). |
| (b) Passes B, C, and D | 550° F. (288° C.). |
| Temperature at outlet from the reactor all passes | 976° F. (525° C.) |
| Mean coolant density in the reactor | 1.042 lb./ft.$^3$. |
| Mass flow in centre channel | 9.22 lb./sec. |
| Pressure drop in centre channel | 10.0 p.s.i. |
| Inlet pipe dimensions | 3″ O.D. x 0.212″ thick. |
| Outlet pipe dimensions | 4″ O.D. x 0.324″ thick. |
| A1.6 Moderator: | |
| Material | $D_2O$. |
| Temperature at inlet to the calandria | 130° F. (54.5° C.). |
| Temperature at outlet from calandria | 180° F. (82.2° C.). |
| Weight of heavy water in calandria | 29.7 tonnes. |
| Weight of heavy water in external circuit | 1.7 tonnes. |
| Total weight of heavy water in system | 31.4 tonnes. |
| A1.7 Design particulars: | |
| Evaporators 16, 17 and 18— | |
| Maximum designed pressure | 1100 p.s.i.g. |
| Steam drum operating pressure | 790 p.s.i.g. |
| Superheated steam inlet temperature | 976° F. (525° C.). |
| Superheated steam outlet temperature | 550° F. (288° C.). |
| Steam drum saturation temperature at 790 p.s.i.g. | 516° F. (268° C.). |
| Pinch point | 34° F. |
| Heat duty | 76.7×10$^6$ B.t.u./hr. |
| Height overall | 24′5″. |
| Outside diameter of shell | 7′6¾″. |
| Shell thickness | 3⅜″. |
| Shell material carbon steel | 28 tons/in.$^2$ U.T.S. |
| Evaporator 19— | |
| Maximum design pressure | 1100 p.s.i.g. |
| Steam drum operating pressure | 790 p.s.i.g. |
| Superheated steam outlet temperature | 850° F. (454° C.). |
| Steam drum saturation temperature at 790 p.s.i.g. | 516° F. (269° C.). |
| Heat duty | 21.65×10$^6$ B.t.u./hr. |
| Height overall | 17′10″. |
| Outside diameter of shell | 5′4¾″. |
| Shell thickness | 2⅝″. |
| Shell material carbon steel | 28 tons/in.$^2$ U.T.S. |
| Control condenser: | |
| Maximum condensing duty | 15.9×10$^6$ B.t.u./hr. |
| Superheated steam inlet temperature | 615° F. (324° C.). |
| Feed inlet temperature | 330° F. (166° C.). |
| Feed outlet temperature | 389° F. |
| Height overall | 7′4″. |
| Outside diameter of shell | 18½″. |
| Shell thickness | ¾″. |
| Material carbon steel | 28 tons/in.$^2$ U.T.S. |
| A1.8 Control: | |
| Control | Moderator level. |
| Shut down system | Moderator dump. |
| Change in $k_{eff}$ | 1.06 to 0.98. |
| Alternative shut down system | Absorber rods. |
| Number (one in centre of core) | 5 (inter lattice positions). |
| Reactivity absorbed (total) by rods | 0.02. |
| Material for shut down rods | 4% boron steel. |
| Diameter of shut down rods | 2½″ O.D. |
| A1.9 Main turbo-alternator: | |
| Number installed | 1. |
| Rating at 0.8 power factor | 30 mv. |
| Shaft speed | 3000 r.p.m. |
| Frequency | 50 c.p.s. |
| Generated voltage | 11 kv. |
| Turbine stop-valve conditions | 600 p.s.i.g./850° F. |
| Condenser vacuum | 28.5 in. Hg. |
| Final feed temperature | 330° F. |

I claim:

1. A steam-cooled nuclear reactor installation comprising a reactor core structure penetrated by first, second and third groups of steam coolant conducting channels having steam inlets and steam outlets, nuclear fuel in the channels, first and second steam generating evaporators disposed external the core structure, said evaporators each having on one heat exchange side a feed water inlet and a generated steam outlet and on the other heat exchange side a heating steam inlet and a heating steam outlet, pipe means connecting the steam inlets of the first channel group in common with the generated steam outlets of the said evaporators, pipe means connecting the steam outlets of the said first channel group with the heating steam inlet of said first evaporator, pipe means connecting the heating steam outlet of said first evaporator with the steam inlets of the said second channel group, pipe means connecting the steam outlets of said second channel group with the heating steam inlet of the said second evaporator, pipe means connecting the heating steam outlet of the said second evaporator with the steam inlets of the said third channel group and means for supplying feed water to the feed water inlets of said first and second evaporators.

2. A steam cooled nuclear reactor installation comprising a liquid moderator-containing vessel perforated by a lattice of vertically orientated calandria tubes, first, second and third groups of steam coolant conducting channels respectively extending lengthwise through the calandria tubes, nuclear fuel removably disposed in the channels, first and second steam generating evaporators disposed external the moderator vessel, said evaporators each having on one heat exchange side a feed water inlet and a generated steam outlet and on the other heat exchange side a heating steam inlet and a heating steam outlet, pipe means connecting the steam inlet ends of the first channel group with the generated steam outlets of said evaporators, pipe means connecting the steam outlet ends of said first channel group with the heating steam inlet of the said first evaporator, pipe means connecting the heating steam outlet of said first evaporator with the steam inlet ends of the said second channel group, pipe means connecting the steam outlet ends of said second channel group with the heating steam inlet of the said second evaporator, pipe means connecting the heating steam outlet of said second evaporator with the steam inlet ends of the said third channel group and means for supplying feed water to the feed water inlets of said first and second evaporators.

3. A reactor installation as claimed in claim 2 wherein a feed pre-heater is connected in series with the feed water inlets of the said first and second evaporators in combination with means for varying feed water temperature passing through said feed pre-heater according to a control variable sensitive to the temperature of steam outflowing from one of the said channel groups.

References Cited in the file of this patent

UNITED STATES PATENTS

| 2,787,593 | Metcalf | Apr. 2, 1957 |
| 2,806,820 | Wigner | Sept. 17, 1957 |

FOREIGN PATENTS

| 1,141,064 | France | Mar. 11, 1957 |
| 219,722 | Australia | May 23, 1957 |
| 799,725 | Great Britain | Aug. 13, 1958 |

OTHER REFERENCES

Proceedings of the Second United Nations International Conference on the Peaceful Uses of Atomic Energy. Held in Geneva September 1–September 13, 1958; vol. 9, United Nations, Geneva, 1958. Pp. 74–78; vol. 8, pp. 398–414.